June 25, 1974 J. B. HODSMAN Re. 28,053

MATERIAL SECURING AND TRANSPORTING APPARATUS

Original Filed Jan. 22, 1971 2 Sheets-Sheet 1

INVENTOR.
JAMES BURR HODSMAN

BY Joseph J. Kelly

ATTORNEY

MATERIAL SECURING AND TRANSPORTING APPARATUS

Original Filed Jan. 22, 1971 2 Sheets-Sheet 2

INVENTOR.
JAMES BURR HODSMAN
BY Joseph J. Kelly
ATTORNEY

United States Patent Office

Re. 28,053
Reissued June 25, 1974

28,053

MATERIAL SECURING AND TRANSPORTING APPARATUS

James Burr Hodsman, Danville, Quebec, Canada, assignor to Canadian Johns-Manville Co., Ltd., Asbestos, Quebec, Canada Original No. 3,688,421, dated Sept. 5, 1972, Ser. No. 108,883, Jan. 22, 1971. Application for reissue Aug. 10, 1973, Ser. No. 387,415
Int. Cl. B66b *17/00;* D06c *3/08*
U.S. Cl. 38—102.1 10 Claims

Matter enclosed in heavy brackets [ ] appears in the original patent but forms no part of this reissue specification; matter printed in italics indicates the additions made by reissue.

ABSTRACT OF THE DISCLOSURE

A material securing and transporting apparatus for handling porous or non-porous materials. The device is provided with a main support having a plurality of material securing implements slidably mounted thereon for contact with a wrinkled material. Upon impinging the material each implement can be outwardly displaced from an interior portion of the support to effectively eliminate undesirable wrinkles within the material.

FIELD OF THE INVENTION

This invention relates to the handling of material, and more particularly to a method and apparatus wherein resilient pieces of fabric are secured and transferred mechanically. While the invention has utility with many types of material, for example, plastic or paper products, it is especially suited for use in the opening of sacks made from jute and the like woven yarns.

BACKGROUND OF THE INVENTION

The achievement of a fully integrated manufacturing system requires that every element be considered and appropriately modified to facilitate an economical, physical, flow of products. Recent inclusion of in-process and industrial packaging as integral parts of the general manufacturing system has served to focus greater attention upon the principles of sack packaging and to foster further improvements and refinements in this field. Knowledge enabling more appropriate selections from increasing combinations of materials and additives is vastly extending the range of sack packaging applications. Sacks can be treated to resist vermin, oils, odors and moisture, and reinforced with fibers to reduce tearing hazards. The sack, as a shipping container, has always had the inherent advantages of low tare weight ratio, flexibility, small required storage space, and low material cost. As increased usage of bulk packaging has paralleled the development of filling, closing, sewing, and other production machinery contributing to the ease of handling bags and sacks, the need has arisen for a method and apparatus adapted to efficiently move sacks for the bulk shipment of such items as chemicals, fertilizers, insecticides, sand, cement, grains, flour, and dog food through their respective processes. The variety of sack sizes and textures presented for handling at an integrated bagging station requires a versatile apparatus readily adaptable to the needs of all packers without such mechanical and electrical complications as would necessitate costly alterations to present equipment layout. Any such apparatus should, additionally, be designed to accommodate a series of instantaneous changes in the relative size, shape, weight, or texture of the material encountered, while permitting, in event of failure, an immediate conversion to manual handling without any interruption of the packer operation with resulting loss of production.

Prior art machinery of the type upon which this invention has improved utilized the relative reciprocal movement between spikes projecting in corresponding rows from the respectively flush surfaces of a plurality of elements (for example, a plate provided with spaced apart elongated sliding bars) to engage the interstices between the woven yarns of a jute bag such that the points of one element would intersect lines passing through the points of the other element. Apparatus of this nature has been disclosed in U.S. Pat. No. 3,285,649 to Harton. Design limitations inherent in such a lifting mechanism tend to cause the rejection of folded material encountered by its operative surface. Those woven fabric patches retaining contact with the reciprocally moving spiked surface and not ruptured by localized stress concentrations concomitantly created through rejection of folded material occasionally interact to bunch up and push or pull more material into disengagement from the surface thereby further reducing the effective area of spike-material communication. "Pants-press" creases imparted during bale storage to the jute bags ofttimes handled by such apparatus, repeatedly prevent a majority of spikes from intersticially engaging the material. The sack droops at the mouth to foil the filling mechanism or falls back to the supply pile in a crumpled condition requiring that the device be shut down until the sack is either removed or straightened and stretched into a condition suitable for presentment to the grasping apparatus.

The persistent occurrence of longitudinal folding in bale stored fabric, and a general inability of the aforementioned mechanism to provide adequate tension throughout a sufficient proportion of the material encountered led to the construction of machinery in which two shafts, inset lengthwise on a plate, and having steel pins inserted in their lower halves would rotate in opposite directions through 90° when brought into contact with the material. After thus placing the fabric in tension across the width dimension, the plate might be raised to transfer the material to a different location. This apparatus, seeming to suffer from the design limitations of its predecessor, frequently failed to achieve a satisfactory coupling. Its unidimensional grasping mechanism could not tolerate a lengthwise fold in any fabric being handled; consequently each bag had to be manually straightened before presentment.

It will be apparent that machinery designed to accommodate any bag (for example fabric, plastic, or paper bags) must confront numerous additional and ofttimes exacting parameters. Within the asbestos industry for example, it is preferred that a porous fabric material composed of fibers such as jute or hemp be utilized to package, ship and store raw fibers. Other similarly unique orders placed by individual customers require a device designed to accommodate a series of instantaneous changes in the relative size, weight, or texture of packaging materials. Essential to such apparatus is the presence of means for substantially eliminating both longitudinal and latitudinal folds from the wide variety of materials presented for handling. Appropriate precautions are required in order to prevent puncturing or defacing any thin, delicate, or ornamental surfaces contacted.

*A more pertinent apparatus, in many respects, than that disclosed in the Harton Patent is disclosed in U.S. Pat. No. 3,356,237 to Walton.*

It is therefore an object of this invention to overcome the deficiencies inherent in previous apparatus of this nature, by providing a method and apparatus useful in the handling of a wide variety of material sizes, weights and textures. It is a particular object of the invention to effectively eliminate the longitudinal, latitudinal and other creases or folds from a variety of materials presented to be mechanically held and transferred to a suitable location.

A further object of the present invention is to provide a method and apparatus of the type described for mechanically securing a sufficient surface portion on the topmost piece of material in a stack of pieces to compel its firm adherence to the apparatus.

A still further object of the invention is to devise a versatile material holding device readily adaptable to a variety of packing operations with minimal alteration to existing equipment layout.

Another object of the invention resides in the provision of a holding device of the type described that will be capable of exclusively securing the top wall of the topmost sack on a stack containing a variety of sack sizes, textures and materials so as to allow the opening up of the sack when lifted off the stack for transfer to a suitable location as, for example, a filling station.

Still another object of the present invention is to provide an automatic holding device of the type described which is relatively simple in design, efficient in operation, and economical to manufacture.

SUMMARY OF THE INVENTION

To accomplish the stated objects, my novel method and apparatus utilizes a plurality of forces extending generally radially outward from an interior position on the surface portion of a fabric material in order to provide sufficient tension throughout a substantial area of the material. The arrangement of the invention permits an instantaneous employment of vacuum means for the accommodation of porous and non-porous fragile or ornate materials. A unique means is thus furnished for effectively eliminating those longitudinal and latitudinal creases or folds formerly frustrating the attainment of a stable union between material and apparatus, and for mechanically securing a sufficient surface portion on the topmost piece in a stack containing a variety of sack sizes, textures and materials to cause an adherence adequate to allow its transfer to a suitable location.

In one aspect of the invention a plurality of shoes, slidably mounted on and flush with the surface of a working plate, move diagonally, radially outward toward positions corresponding with the four corners of a bag. Outwardly inclining pins inserted in each shoe impale and push the material radially outward until the resilient fabric is stretched between the shoes in two dimensions. Each shoe and its spikes work individually to engage the material at respectively remote positions thereby insuring sufficient joinder not withstanding a fold in one dimension. A resultant increase in stretch travel enables the inventive system to handle sacks as they arrive from a bale. In another arrangement a vacuum acts through apertures located on or about the shoes to cause the requisite coupling. The novel apparatus overcomes design deficiencies inherent in previous apparatus of this nature by utilizing these simple and inexpensive mechanical means to stretch, straighten, and effectively eliminate undesirable wrinkles from a variety of materials presented to be held and transferred to a suitable location.

The above and other objects will in part be obvious and will in part appear hereinafter.

BRIEF DESCRIPTION OF THE DRAWINGS

For a fuller understanding of the nature and objects of the invention, reference should be had to the following detailed description taken in conjunction with the accompanying drawings wherein.

DETAILED DESCRIPTION OF THE DRAWINGS

The material handling implements of the present invention may be fabricated in a number of relatively simple configurations. As a consequence the invention will be found to function with most varieties of material handling apparatus. For the present illustrative purposes the invention is described in connection with a material handling device of the bag placing variety. To facilitate the discussion to follow, the component parts of this apparatus which remain identical throughout the figures are provided with the same numeration.

Figure 1:
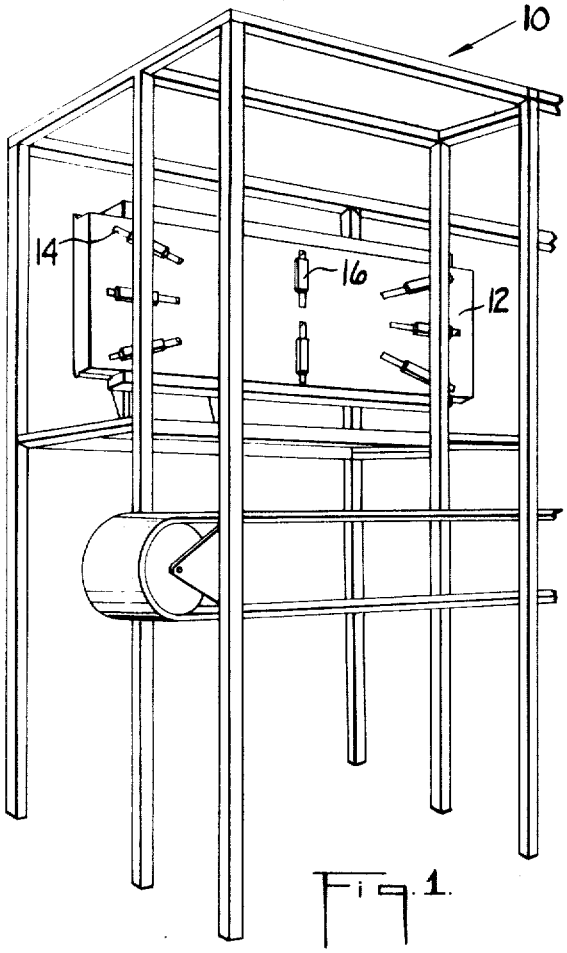
FIG. 1 is a perspective view of a material handling device incorporating, among other components, an embodiment of the present invention.

Referring to FIG. 1, the material holding apparatus 10 is shown formed from a somewhat unitary structure having a main plate 12 of an elongated rectangular shape corresponding to the general dimensions of the material presented for handling. Extending generally radially outward from the central portion of the main plate 12 and slidably mounted within a plurality of grooves having generally T-shaped cross sections 14 are material securing implements 16 which can be individually displaced along their respective grooves by actuating air cylinders 18. Such power means, shown in FIG. 4, can be conveniently welded to the main plate 12 for support in a position permitting the piston rod 20 of a cylinder 18 to be connected with suitable linkage 22 for displacing an implement 16 along a groove until such implement, having a sliding fit therein, is restrained from moving further by the resilient properties of any material adhering to it.

Figure 3:
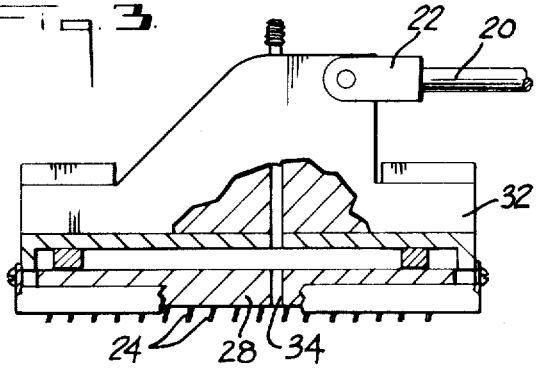
FIG. 3 is a cross-sectional side view of the implement of FIG. 2 taken along the section 3—3 of FIG. 2.
Figure 2:
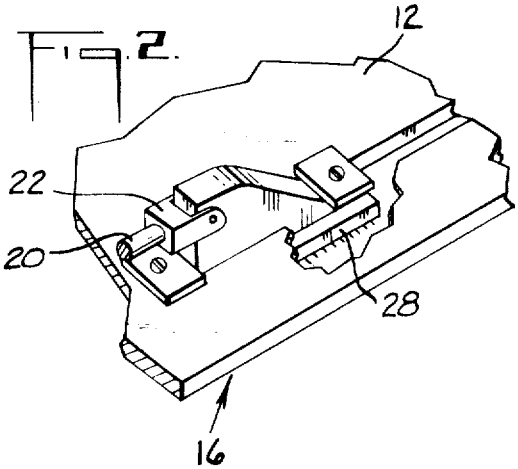
FIG. 2 is a perspective view of the embodiment of the invention pictured in FIG. 1, showing its structure in more detail.
Figure 5:
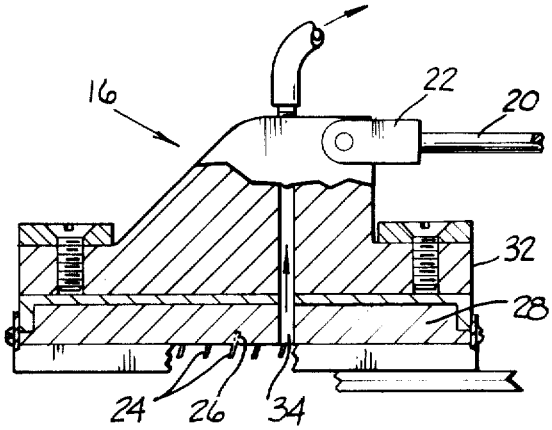
FIG. 5 is a perspective view of a material holding mechanism for the handling arrangement of FIG. 1 incorporating an alternate embodiment of the invention.
Figure 6:
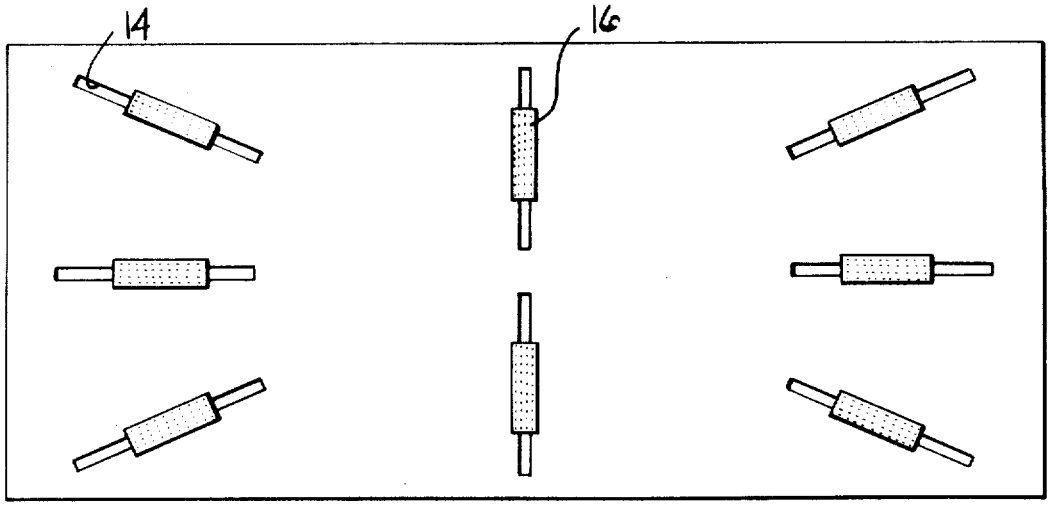
FIG. 6 is a top plan view of the embodiment of the invention pictured in FIG. 1.
Figure 7:
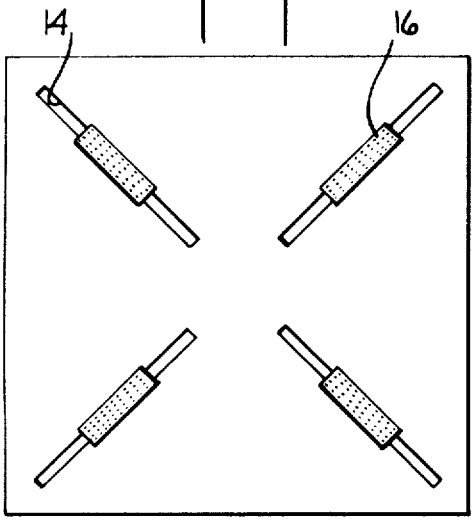
FIG. 7 is a top plan view of a material handling device incorporating an alternate embodiment of the invention.

Referring to FIGS. 2 and 3 this implement is revealed in more detail. Although the configuration of implement 16 may be modified to function with a variety of material handling applications, it is sometimes preferable to machine it from "derlin" plastic with steel pins 24 inserted into a plurality of bores 26 in a base plate 28 of such implement 16 at an outward angular inclination of approximately 15°. In one aspect of the invention base plate 28 can be slidably adjusted within the hollow housing 32 of implement 16 to permit the steel pins 24 to extend below the substantially flat material working surface 30 of main plate 12. Contact between main plate 12 and the presented material 38 actuates cylinders 18 to cause the radial displacement of each respective securing implement 16. The rigidly fitted steel pins engage the interstices between the woven yarns of a fabric to produce a satisfactory coupling and cause the material 38 to be stretched as each implement moves generally radially outward toward the exterior portions of the material. Although the resilient characteristics of materials vary considerably, the requisite tension exerted on the material during radial movement of each implement will generally be achieved without an elongation of the woven textile yarns. When employing a smaller number of material securing implements it is desirable to maintain a proportionately larger angle between the respective radial paths traveled by each implement. Preferably, for rectangular shaped materials, the angles between any two paths traveled should be approximately the same. In another aspect of the invention, shown also at FIG. 5, the base plate 28 can be slidably elevated within the hollow housing unit 32 of implement 16 to prevent steel pins 24 from defacing or puncturing an ornamental or fragile material surface. A vacuum means is employed to draw air upward through an orifice 34 located on or about each securing implement. Such orifices can conveniently be arranged within the hollow housing unit 32 of each implement 16 to provide a suction sufficient to attract, firmly secure, and maintain continued contact with a presented material 38 during such time as the implements shape, straighten and transfer the material 38 to a suitable location. The mechanical coupling of each aforementioned securing means permits the mechanism to accommodate an instantaneous change in a wide variety of material sizes, shapes and textures. When necessary both securing means can be arranged to function simultaneously for increased adherence between the material and each contacting implement.

In the embodiments thus far described it was desired to straighten each piece of material prior to transfer to a suitable location. Inasmuch as material handling applications vary considerably, it may sometimes be necessary to grip and transfer various material sizes, shapes, and textures in a number of unstraightened forms. Certain alterations to the above securing apparatus will permit its functioning within the scope of the invention herein involved to secure and transfer resilient materials in countless configurations of the unstraightened variety. Securing implements 16 can even be removed or maintained in an immobile state, for example, to permit use of a vacuum means in the ordinary way to transfer unstraightened non-porous materials. Such modifications are intended to fall within the spirit and scope of the present invention as defined by the subjoined claims.

Figure 4:
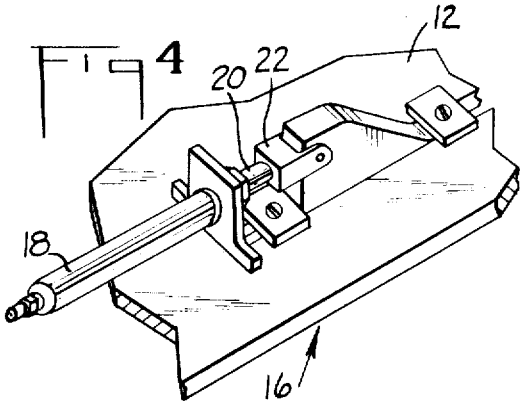
FIG. 4 is a side elevational view of a power air cylinder individually actuating a material securing implement of FIG. 1.

In the use of the apparatus 10 for securing and transferring a piece of material 38, main plate 12 is brought to bear on the topmost fabric in a stack of such fabrics so as to ensure a firm contact between material securing implements 16 and the topwall 36 of said fabric. As shown in FIG. 4, each material securing implement 16 is individually actuated by air cylinders 18 which, in turn, can be energized by the closing of a limit switch in the conventional manner upon contact between main plate 12 and the material 38. The variance in travel speed and distance thereby created reduces tearing hazards while increasing the relative distance moved by each securing implement 16. With this increased stretching power the securing implements 16 slide radially outward along grooves 14 to exercise far greater straightening potential than is possible with the relatively reciprocating elements utilized by prior art devices. Outwardly inclining pins 24 inserted in each material securing implement 16 or, alternatively, a vacuum means preferably exerted from within the securing implements 16 produce an adherence between the material and each respective securing implement 16. These implements continue to push or draw the material radially outward until the resilient fabric is stretched between the securing implements 16 in two dimensions. After thus placing the fabric in a sufficient duodimensional tension, main plate 12 can be raised to create an opening between the upper and lower layers of a sack, for example.

Figure 8:
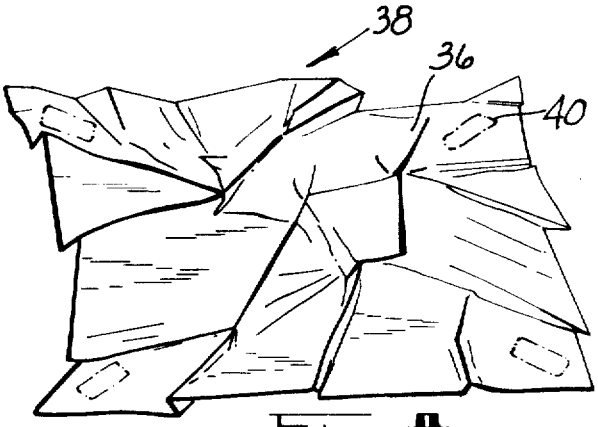
FIG. 8 is a pictorial representation showing a creased material, the dotted portions depicting those areas about to be contacted by the material securing implements of FIG. 2.
Figure 9:
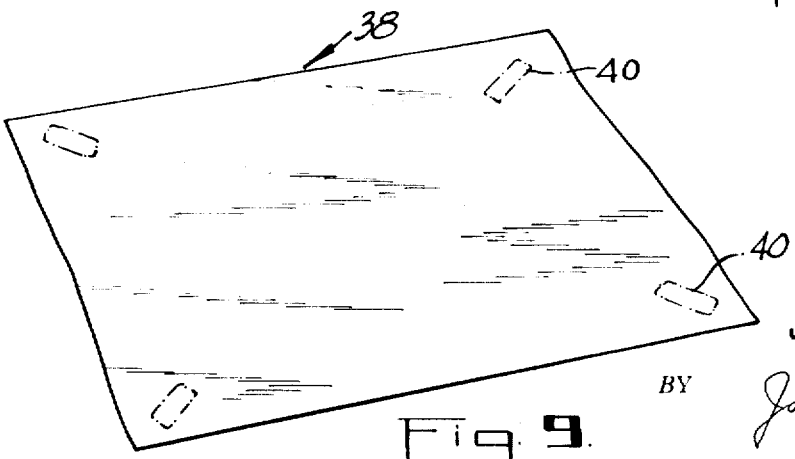
FIG. 9 depicts the subject matter of FIG. 8 showing, however, the material and its relation to each contacting implement after an effective elimination of creases has been achieved.

Referring to FIGS. 8 and 9 the above discussed procedure for securing a sufficient surface portion on the topmost piece of material in a stack of pieces to compel its firm adherence to the apparatus is illustrated. The figures show a severely creased material 38 awaiting subjection to the method and apparatus for securing its transfer to a suitable location. Each dotted portion 40 on the material surface connotes an area appointed for engagement with the material securing implements 16. Note that in FIG. 4 a prior art device utilizing relatively reciprocating elements could not be brought to bear upon this piece of material such that a majority of points spaced equidistantly over substantially the entire length of such elements would engage the interstices between the woven yarns of the material. Those creased portions of the material which do contact the several points positioned along the relatively reciprocating elements of a prior art apparatus and which are not rejected by the reciprocal movement or ruptured be localized stress concentrations concomitantly created through rejection of folded material will interact to bunch up and push or pull more material into disengagement from the operative surface thereby further reducing the area of spike-material communication. Accordingly, when previous devices encountered a creased or crumpled material, its condition was considered to be so unacceptable for handling that the material had to be laid out flat with care manually. As illustrated in FIGS. 8 and 9 the dramatic results achieved by our unique device have virtually eliminated the necessity for manually straightening each piece of material before presentment. The individually actuated securing implements engage the material at respectively remote positions and work separately to straighten severely creased materials notwithstanding a fold in one dimension. Since material-apparatus relationships previously thought inappropriate are now quite proper, a desirable integration of this industrial packaging element into the general manufacturing system in order to facilitate an economical and efficient physical product flow which will conspicuously reduce or eliminate extra and unnecessary expense in thousands of factories and distribution activities can be achieved.

It will be apparent to those versed in the science of material handling that the material securing arrangement of this invention may assume a variety of configurations depending upon the material handling application with which it is used. Where appropriate, as discussed in connection with FIG. 1, the arrangement may be inserted among other components in the production of a fully integrated material handling system. For material handling systems currently in use, the arrangement of the invention may be fabricated as an optional accessory. The positioning of the material securing means may be arranged with respect to other components in the system to permit an instantaneous conversion to manual handling. Subsidiary advantage may also be realized from the above discussed positioning of the securing mechanism. For instance the securing implements can be advantageously positioned to work within contaminated or inaccessible areas in which environmental conditions render undesirable the prolonged human exposure necessitated by most manual operations.

Since certain changes may be made in our novel material handling arrangement without departing from the scope of the invention herein involved, it is intended that all matter contained in the above description or shown in the accompanying drawings shall be interpreted as illustrative and not in a limiting sense.

What I claim:

[1. A material securing and transporting apparatus adapted to stretch a wrinkled material in two dimensions, which comprises:

a. a main support;

b. a plurality of material securing implements slidably mounted on said support for contact with said material, each of said implements including at least one securing means for securing to said implement portions of said material contacted by said implements;

c. means for positioning said implements to contact the material; and d. means for automatically individually displacing each of said implements generally radially outward from an interior portion of said support in response to a predetermined signal, whereby to stretch said material and thereby effectively remove undesirable wrinkles.]

[2. The invention as recited in claim 1, wherein each implement includes a plurality of securing means, each of which comprises a spaced projection outwardly protruding and angularly inclined in the radially outward direction traveled by such implement.]

3. The invention as recited in claim [1] *12* wherein said securing means includes vacuum means adapted to secure said material to said implements.

[4. The invention according to claim 1 wherein:

a. a summation of angles formed between lines congruent with and extending through paths traveled by said implements during their radial displacement equals 360°;

b. each of said angles has approximately the same magnitude.]

[5. The invention according to claim 1, wherein: lines congruent with and extending through paths traveled by said implements during their radial displacement are perpendicular to each other.]

[6. The invention according to claim 1, wherein the means for individually displacing each of said implements comprises at least one air cylinder connected to each implement; and said positioning means includes means for activating said air cylinder upon contact between the material and said implements.]

7. A material securing and transporting apparatus adapted to stretch a wrinkled material in two dimensions, which comprises:

a. a main support;

b. a plurality of material securing implements slidably mounted on said support for contact with said material;

c. means for positioning said implements to contact the material;

d. means for individually displacing each of said implements generally radially outward from an interior portion of said support;

e. vacuum means associated with said implements for securing to said implements portions of material contacted by the implements, whereby undesirable wrinkles within the material are effectively eliminated.

8. An assembly for securing and stretching material in two directions, said assembly comprising:

a. a support base;

b. a plurality of material securing implements mounted on and slidably movable along said support base, each of said implements including a plurality of projections connected with and extending from said implement at an acute angle with respect to the direction of said movement and vacuum means, said projections and vacuum means being provided for alternatively securing portions of said material to said implements upon contact of the latter with said material;

c. means for positioning said implements in contact with said material; and d. means for slidably displacing said implements after the latter are positioned in contact with said material for stretching said material.

[9. A process for securing and transporting material, comprising the steps of:

a. impaling portions of a resilient material with a plurality of spaced projections; and b. automatically displacing the projections generally radially outward from an interior portion of the material in response to a predetermined signal, whereby undesirable wrinkles within said material are effectively eliminated as the material is stretched in two dimenions.]

[10. A process for securing and transporting material, as recited in claim 9 wherein said spaced projections engage interstices between woven yarns of a fibrous sack.]

11. A process for securing and transporting material, comprising the steps of:

a. contacting portions of a material with a plurality of implements;

b. applying a vacuum through said implements to secure said portions of material;

c. individually displacing each implement generally radially outward from an interior part of the material, whereby undesirable wrinkles within said material are effectively eliminated as the material is stretched in two dimensions.

*12. A material securing and transporting apparatus adapted to open a flexible sack, to stretch said sack in two dimensions and transfer said opened stretch sack to a sack filling station, which comprises:*

*a. a main support;*

*b. a plurality of sack securing implements slidably mounted on said support for contact with said sack, each of said implements including at least one securing means for securing to said implement portions of said material contacted by said implements;*

*c. means for positioning said implements to contact the sack;*

*d. means for automaticlly individually displacing each of said implements generally radially outward from an interior portion of said support in response to a predetermined signal whereby to stretch said sack and thereby effectively remove undesirable wrinkles;*

*e. means for moving said implements and said secured sack for automatically opening said sack; and*

*f. means for positioning said opened and secured sack at said sack filling station.*

*13. The invention as recited in Claim 12, wherein each implement includes a plurality of securing means, each of which comprises a spaced projection outwardly protruding and angularly inclined in the radially outward direction traveled by such implement.*

*14. The invention according to Claim 12 wherein:*

*a. a summation of angle formed between lines congruent with and extending through paths traveled by said implemets during their radial displacement equals 360°; and*

*b. each of said angles has approximately the same magnitude.*

*15. The invention according to Claim 12, wherein: lines congruent with and extending through paths traveled by said implements during their radial displacement are perpendicular to each other.*

*16. The invention according to Claim 12, wherein the means for individually displacing each of said implements comprises at least one air cylinder connected to each implement; and said positioning means includes means for activating said air cylinder upon contact between sack and said implemets.*

*17. A process for securing opening and transporting a flexible sack comprising the steps of:*

*a. impaling portions of a said sack with a plurality of spaced projections;*

*b. automatically displacing the projections generally radially outward from an interior portion of the sack in response to a predetermined signal, whereby undesirable wrinkles within said sack are effectively eliminated as the sack is stretched in two dimensions;*

*c. moving said projections and impaled sack for automatically opening said sack; and*

*d. positioning said opened and impaled sack at sack filling station.*

References Cited

UNITED STATES PATENTS

The following references, cited by the Examiner, are of record in the patented file of this patent or the original patent.

| | | | |
|---|---|---|---|
| 2,160,337 | 5/1939 | Makee | 38—102.1 |
| 2,832,171 | 4/1958 | Batey | 38—102.91 |
| 3,226,861 | 1/1966 | Bird | 38—102.91 |
| 3,356,237 | 12/1967 | Wilson | 38—102.1 |

PATRICK D. LAWSON, Primary Examiner

U.S. Cl. X.R.

214—89